(12) United States Patent
Westrick, Jr. et al.

(10) Patent No.: US 8,296,488 B2
(45) Date of Patent: Oct. 23, 2012

(54) AUTOMATIC SELF-ADDRESSING METHOD FOR WIRED NETWORK NODES

(75) Inventors: Richard L. Westrick, Jr., Social Circle, GA (US); Dalibor Zulim, Conyers, GA (US)

(73) Assignee: ABL IP Holding LLC, Conyers, GA (US)

( * ) Notice: Subject to any disclaimer, the term of this patent is extended or adjusted under 35 U.S.C. 154(b) by 310 days.

(21) Appl. No.: 12/768,270

(22) Filed: Apr. 27, 2010

(65) Prior Publication Data

US 2010/0274945 A1 Oct. 28, 2010

Related U.S. Application Data

(60) Provisional application No. 61/172,906, filed on Apr. 27, 2009.

(51) Int. Cl.
*G06F 13/00* (2006.01)
*G06F 3/00* (2006.01)

(52) U.S. Cl. .............. 710/104; 710/9; 710/316

(58) Field of Classification Search .......... 710/3, 8–10, 710/15, 19, 300, 104, 305, 316
See application file for complete search history.

(56) References Cited

U.S. PATENT DOCUMENTS

| | | | |
|---|---|---|---|
| 4,730,251 A | 3/1988 | Aakre et al. | |
| 4,959,775 A | 9/1990 | Yonekura | |
| 5,034,878 A * | 7/1991 | Haapala et al. | 709/221 |
| 5,175,822 A * | 12/1992 | Dixon et al. | 710/9 |
| 5,404,460 A * | 4/1995 | Thomsen et al. | 710/9 |
| 5,517,617 A | 5/1996 | Sathaye et al. | |
| 5,604,914 A | 2/1997 | Kabe | |
| 5,675,830 A | 10/1997 | Satula | |
| 5,831,546 A | 11/1998 | Costa | |
| 6,163,823 A | 12/2000 | Henrikson | |
| 6,216,172 B1 | 4/2001 | Kolblin et al. | |
| 6,240,478 B1 | 5/2001 | Brickell | |
| 6,460,093 B1 | 10/2002 | Taugher | |
| 6,653,810 B2 * | 11/2003 | Lo | 318/569 |
| 6,700,877 B1 | 3/2004 | Lorenz et al. | |
| 6,738,920 B1 | 5/2004 | Horne | |
| 6,928,501 B2 | 8/2005 | Andreas et al. | |
| 6,961,633 B1 | 11/2005 | Marbach et al. | |
| 6,982,953 B1 | 1/2006 | Swales | |
| 6,999,996 B2 | 2/2006 | Sunderland | |

(Continued)

FOREIGN PATENT DOCUMENTS

DE 10038783 A1 3/2001

(Continued)

*Primary Examiner* — Thomas J Cleary

(74) *Attorney, Agent, or Firm* — Kilpatrick Townsend & Stockton LLP

(57) ABSTRACT

A method and system for addressing nodes in a multi-drop wired network are disclosed. In an embodiment nodes communicate via a two-way communication bus. Upon receipt of an address command, a first node assigns itself a first address, closes a switch to activate an output port of the first node to enable a second node to receive communications from the first node, and sends a second address onto the two-way communication bus. The second address is received by all previously addressed nodes, including a controller if used, as well as the second node, which is as yet unaddressed. Upon receipt of the second address, the second node repeats the process. If a node does not receive an acknowledgement that a subsequent node has addressed itself, that node deactivates its output port and terminates the network.

18 Claims, 13 Drawing Sheets

U.S. PATENT DOCUMENTS

| | | |
|---|---|---|
| 7,093,050 B2 | 8/2006 | Niklasson |
| 7,096,287 B1 | 8/2006 | Champagne et al. |
| 7,164,966 B2 * | 1/2007 | Sudolcan ............ 700/239 |
| 7,328,286 B2 | 2/2008 | Vinnemann |
| 7,369,060 B2 | 5/2008 | Veskovic et al. |
| 7,430,592 B2 | 9/2008 | Schmidt et al. |
| 2002/0016875 A1 | 2/2002 | Yokoyama |
| 2002/0108007 A1 | 8/2002 | Mosgrove |
| 2004/0117537 A1 * | 6/2004 | Vandensande ............ 710/305 |
| 2004/0225811 A1 | 11/2004 | Fosler |
| 2005/0132109 A1 | 6/2005 | Steger |
| 2006/0020350 A1 | 1/2006 | Khanchin |
| 2006/0079972 A1 | 4/2006 | Simonazzi |
| 2008/0040515 A1 | 2/2008 | Schaetzle |
| 2009/0105846 A1 | 4/2009 | Hesse et al. |

FOREIGN PATENT DOCUMENTS

| | | |
|---|---|---|
| EP | 0684560 A1 | 5/1994 |
| JP | 01076173 A | 3/1989 |
| JP | 04006994 A | 1/1992 |

* cited by examiner

AUTOMATIC SELF-ADDRESSING METHOD FOR WIRED NETWORK NODES

CROSS-REFERENCE TO RELATED APPLICATIONS

This application claims the benefit of U.S. Provisional Application No. 61/172,906 filed on Apr. 27, 2009, which is incorporated herein by reference.

FIELD OF DISCLOSURE

The field of this disclosure relates to operation of wired networks of nodes, and in particular to the automatic self-addressing of the nodes in wired networks.

BACKGROUND

In a wired network, node addressing can present a challenge. Often, this addressing is manually set or manually correlated with the installed location of the devices so that networked equipment can be properly configured for its intended function. For example, in an EIA-RS485 network each node can be configured with a unique address and both ends of the communication bus terminated with matching resistors to enable reliable communication and maximum network length. In the past, the installer or commissioning agent would manually set each address and either know or search to determine which node is physically first and last to successfully terminate the EIA-RS485 bus. As another example, in a DALI network the user addresses each node, typically via some type of DALI controller and software. This process can be very confusing to average users and frequently results in either a non-functioning system or a system that requires additional expertise and expensive technical support to troubleshoot.

Previous attempts to solve the addressing problem for multi-drop networks have involved either the addressing of devices at the factory based on their planned installation location or the use of random addressing schemes. Factory addressing can eliminate some of the problems and hassle associated with addressing networks in the field, but requires a large amount of coordination between the factory and installer before the units are shipped. This coordination adds significant costs and lead time to products and introduces many opportunities for error and further hassle in the manufacturing, installation, and maintenance processes (i.e. incorrect addressing or labeling at the factory, installation in the wrong location, needing special equipment to address a replacement station if one fails, etc). Random addressing, which can be initiated either through software or a physical activation by the user, eliminates the need for physical wheels or switches that would otherwise be required to manually set the address, but requires a lengthy commissioning procedure in which the location of each randomly addressed device is "found" and entered into a database so that it can be properly identified and configured for its intended use.

SUMMARY

In one embodiment, a new addressing method and associated circuitry enables any and all nodes connected on a multi-drop wired network to automatically self-address and optionally also self-terminate (if applicable) based on their sequential electrical location in the network. The automated addressing scheme described herein can be applied to any multi-drop wired network or communication protocol and with any networked device. However, DALI and EIA-RS485 networks are presented here as embodiments for illustration purposes only. One of ordinary skill in the art will recognize, though, that other networks including but not limited to those comprising EIA-RS232, EIA-RS422, EIA-423, I2C (inter-integrated circuit), or CAN (controller-area network) nodes are also possible within the embodiments described herein.

BRIEF DESCRIPTION OF DRAWINGS

These and other features, aspects, and advantages of the present disclosure are better understood when the following Detailed Description is read with reference to the accompanying drawings, wherein.

DETAILED DESCRIPTION

Detailed embodiments are disclosed herein. However, it is to be understood that the disclosed embodiments are merely exemplary and that different embodiments are possible. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the present disclosure.

Figure 1:
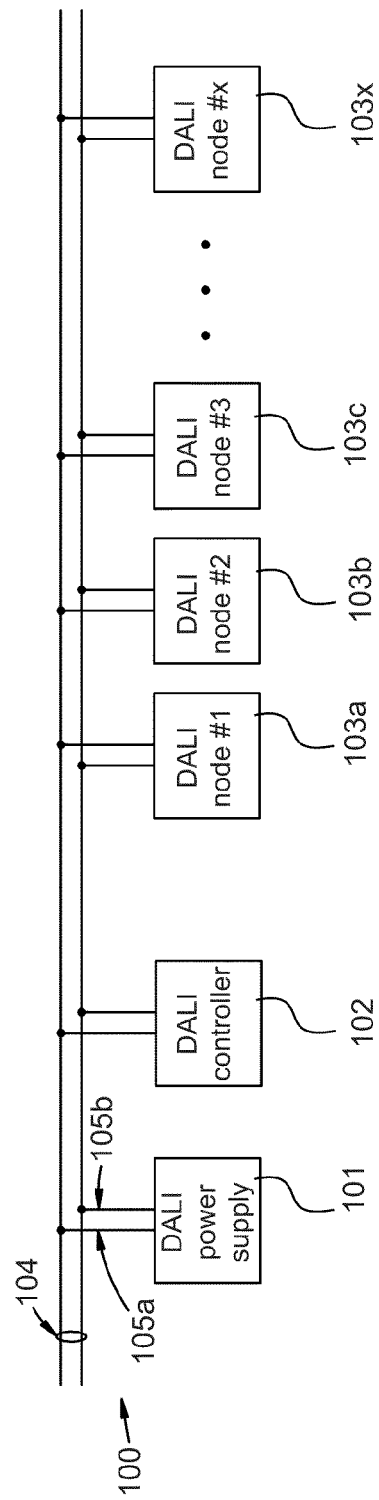
FIG. 1 illustrates a prior art DALI network configuration.
Figure 2:
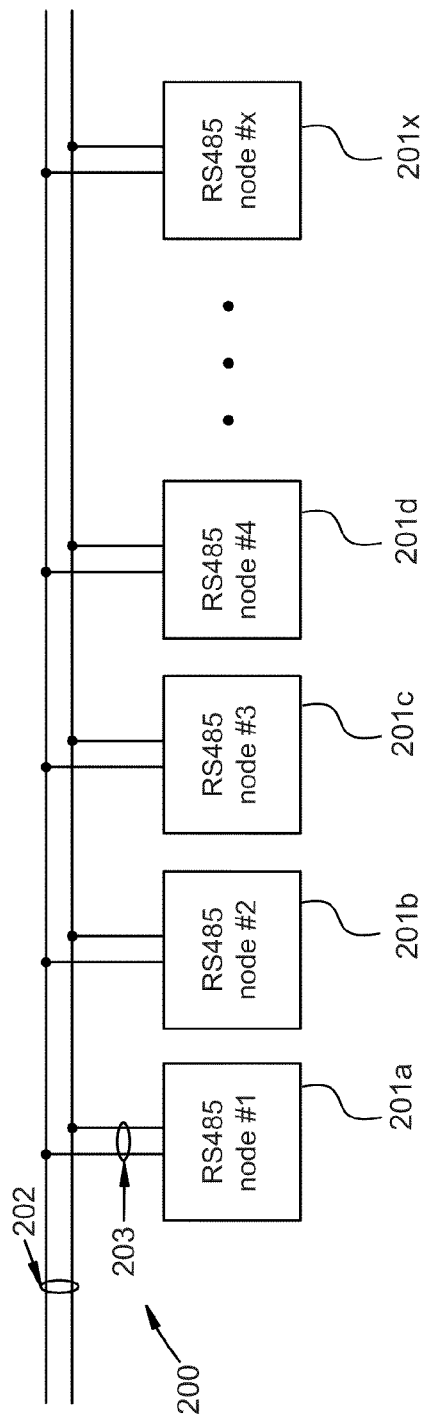
FIG. 2 illustrates a prior art RS485 network configuration.

FIG. 1 illustrates a prior art DALI network configuration. DALI network 100 typically comprises a power supply 101, a controller 102, one or more nodes 103a, ..., 103x, and a communication bus 104. Each node 103a-x comprises a DALI port, which itself comprises an input port and an output port, as exemplified by wires 105a and 105b associated with node 103a, through which it connects to the communication bus 104. Preferably these wires are short and are inside the electrical or DALI node box. Similarly, FIG. 2 illustrates a prior art EIA-RS485 network configuration. RS485 network 200 typically comprises one or more nodes 201a, ..., 201x as well as a communication bus 202. Each node 201a-x comprises an RS485 port, which itself has an input port and an output port, as exemplified by 203a and 203b associated with node 201a, through which it connects to the communication bus 202. In the past, these typical prior art networks have been addressed as discussed in the background section above.

Figure 3:
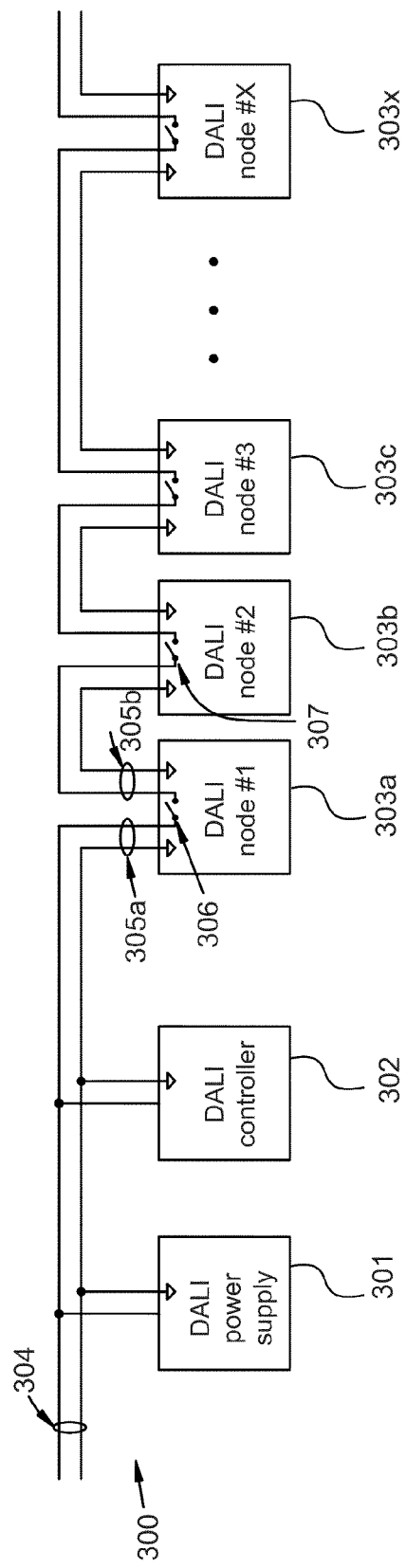
FIG. 3 illustrates a DALI network configuration in an exemplary embodiment.

FIG. 3 illustrates an embodiment of a modified DALI network configuration for use with embodiments disclosed herein. In this embodiment, DALI network 300 comprises a power supply 301, an optional controller 302, one or more nodes 303a, . . . , 303x, and a communication bus 304 permitting two-way broadcast communication between nodes connected to the network 300. Each node 303a-x has input and output ports, as exemplified by 305a and 305b associated with node 303a respectively, through which it connects to the communication bus 304. In this embodiment, input port 305a and output port 305b embody a series switch 306 that activates output port 305b thereby permitting node 303b to connect via the communication bus 304 to DALI power supply 301, DALI controller 302 (if used), and node 303a.

Figure 4:
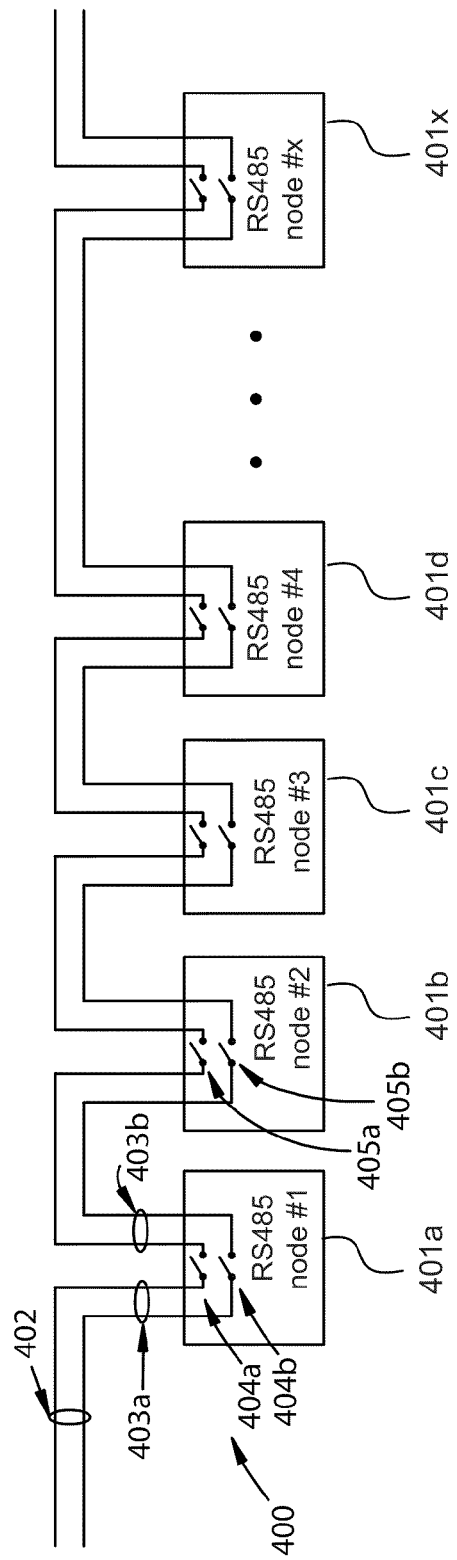
FIG. 4 illustrates an RS485 network configuration in an exemplary embodiment.

FIG. 4 illustrates an embodiment of a modified RS485 network configuration for use with embodiments disclosed herein. In this embodiment, RS485 network 400 comprises one or more nodes 401a, . . . , 401x as well as a communication bus 402. permitting two-way broadcast communication between nodes connected to the network 400 Each node 401a-x has an input port and an output port, as exemplified by 403a and 403b associated with node 401a respectively, through which it connects to the communication bus 402. In this embodiment, input port 403a and output port 403b embody switches 404a and 404b that activate output port 403b thereby permitting node 401b to connect via the communication bus 402 to node 401a.

The addition of a series switch device, as exemplified by series switch 306, to each node 303a-x of a DALI network provides a DALI hardware implementation suitable for use with a method of automatic addressing. Similarly, the addition of one or more series switch devices, as exemplified by series switches 404a and 404b, to each node 401a-x of an RS485 network provides an RS485 hardware implementation suitable for use with a method of automatic addressing. The switches can be solid state components like transistors (BJTs), MOSFETs, SCRs, TRIACs (thyristors), etc, or electro-mechanical relays.

The series switch (or switches) in each node acts to split the network into a number of individual sections which can be dynamically separated and rejoined as part of the addressing procedure. For example, in FIG. 3, initially the series switch in each node, as exemplified by switch 306, is in the open or OFF position; so only the first node 303a is electrically connected to the DALI controller 302 and can "communicate" with it. When the DALI controller 302 initiates the self address procedure by sending a "start self address and start with x address" command, the first node 303a receives that message, assigns itself the address from the received message, closes or turns ON series switch 306, which activates output port 305b, and sends a "start self address and start with x+1 address" message through output port 305b onto communication bus 304. Due to the settings of switches to the OFF position in the other network nodes, which results in deactivating their respective output ports, the only unaddressed node that receives the "start self address and start with x+1 address" is the next node 303b. However, all previously addressed nodes (such as node 303a), whose output ports have been activated by closing their respective switches, as well as the controller, likewise receive the command. Upon reception of this message, the second node 303b then assigns the "x+1" address to itself, closes or turns ON its series switch 307 and communicates x+2 address onto the communication bus 304, resulting in the next node 303c being the only unaddressed node to receive the command, and so on. The series switch stays closed in each node once it has been addressed, thereby making a standard and complete communication network where nodes are connected in parallel. The series switches will remain in the ON (closed) position until the nodes again receive the DALI command from the controller 302 to initiate the self-address process. Upon reception of this command, each node opens or turns OFF the series switch and the process of self addressing repeats again. This process could be repeated numerous times and/or periodically to ensure that the assigned address is valid. Similarly, a confirmation message with whatever information is deemed most appropriate by the designer can be sent by the nodes as they are addressed, or after the addressing is complete, so that controller 302 can compare nodes currently online and addressed with those that have been online and addressed previously. This addressing can be sequential (x+1) or any other suitable incremental or decremental logic.

An EIA-RS485 example embodiment of an automatic addressing scheme can be implemented with an electromechanical relay. Any voltage drop across the series switch preferably is limited due to the low operating voltage of this system, which effectively precludes the use of a solid state switch for all EIA-RS485 networks except those used with relatively few nodes. Naturally, if a solid state switch were available with a very low on state resistance, it could be used for networks with higher quantities of nodes. The system can be implemented with a single DPDT (double pole double throw) relay or two SPDT (single pole double throw) relays. Similarly, it will be obvious to those skilled in the art that any alternate components which allow the terminating resistor or network wires to be connected and disconnected by the controller (not shown), including those which are integrated into a transceiver chip or other components, could be used in the circuit. Single DPDT relays are used in this example for simplicity of describing the system. Initially, the series switch, as exemplified by switches 404a and 404b in each EIA-RS485 node 401a-x, are in the OFF (open) position. The terminating and bias resistors (not shown) of every node 401a-x are connected in this OFF position. This allows only the first EIA-RS485 node 401a to communicate with the controller (master) (not shown). The controller sends "start self addressing and start with x address". Similarly to the DALI example, the first node 401a in EIA-RS485 bus receives that signal, assigns "x" address to itself, closes the switches 404a and 404b, which activate output port 403b, and communicates "x+1" address through output port 403b onto the communication bus 402. The only unaddressed node that receives this command is the next node 401b. However, all previously addressed nodes (such as node 401a), whose switches have been closed, also receive the command. If the first node 401a receives acknowledgement that the second node 401b is present, then its switches 404a and 404b will remain in the ON position. Otherwise, switches 404a and 404b return to the OFF position and the EIA-RS485 bus terminates with node 401a. However, if the first node 401a receives the acknowledgement, switches 404a and 404b remain in the ON position, the second node 401b assigns "x+1" address to itself, closes its switches 405a and 405b, and sends "x+2" address to the next node 401c. The process continues until all of the nodes 401a-x on EIA-RS485 network are addressed and the last node 401x terminates the EIA-RS485 bus.

Figure 5:
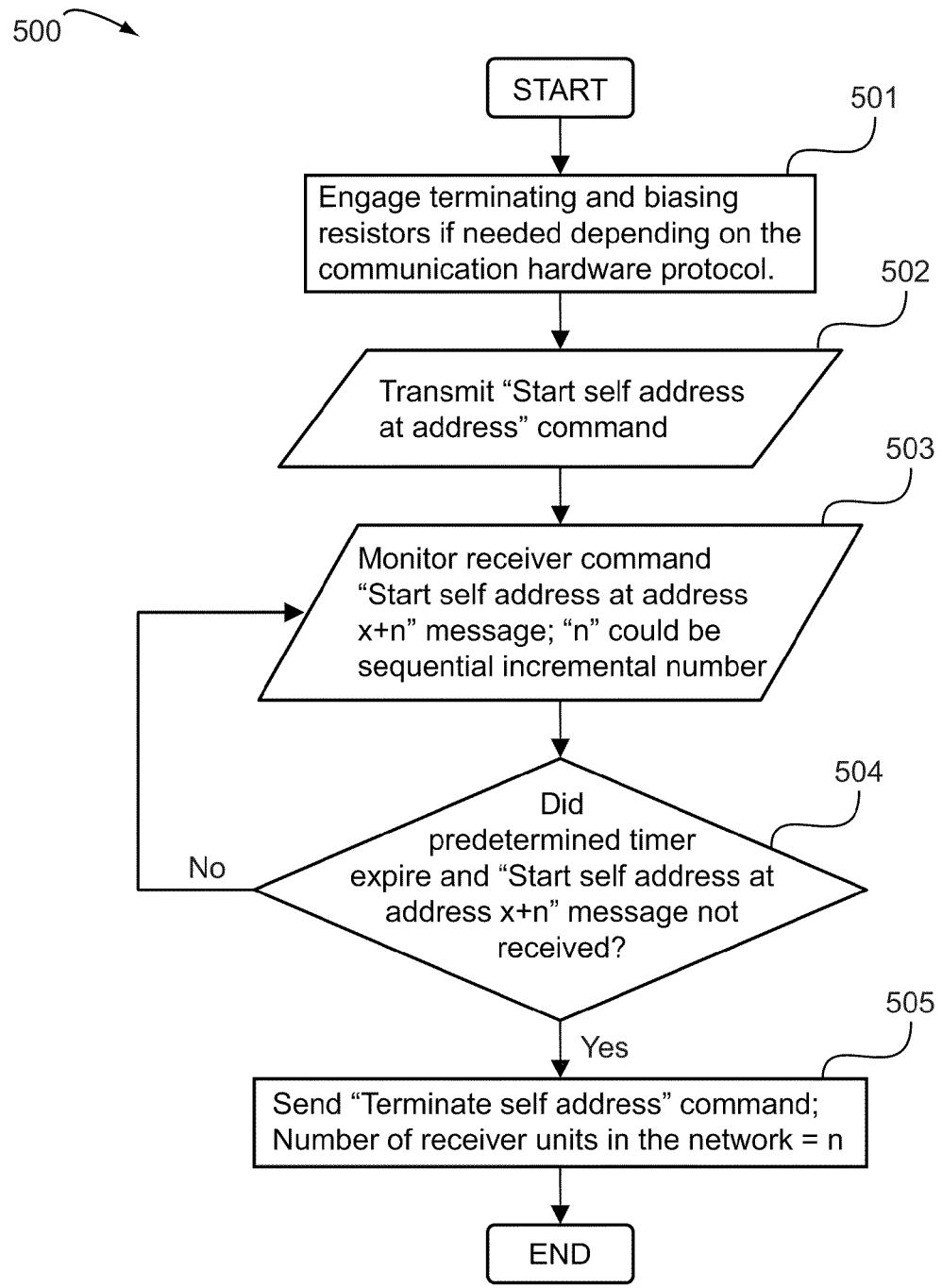
FIG. 5 illustrates a flowchart of an addressing method in an exemplary embodiment.

FIG. 5 illustrates a flowchart for an embodiment of an automatic addressing method 500 implemented at a controller unit. At block 501, the method engages any terminating and biasing resistors as needed. Once this step is complete, the controller transmits a command to tell the first node to start the self-addressing procedure and which address to start with, e.g. start at address "x." At block 503 the controller monitors the communication bus to detect if a command to start address at, for example, "x+n," is sent by any of the nodes. This monitoring occurs for a predetermined period of time as set by a timer. If at decision block 504, the timer has not expired, the controller continues monitoring. If at decision block 503 the timer has expired, then at block 505 the controller sends a command to terminate the self-addressing procedure. The number of nodes that have been addressed is then determined by the controller based on the difference between the initial start address and the last address sensed by the controller as having been sent onto the bus. In the example here the controller determines the number of nodes to be "n" where "x+n" is the last address detected by the controller in a command sent by a node and "x" is the initial start address.

Figure 6:
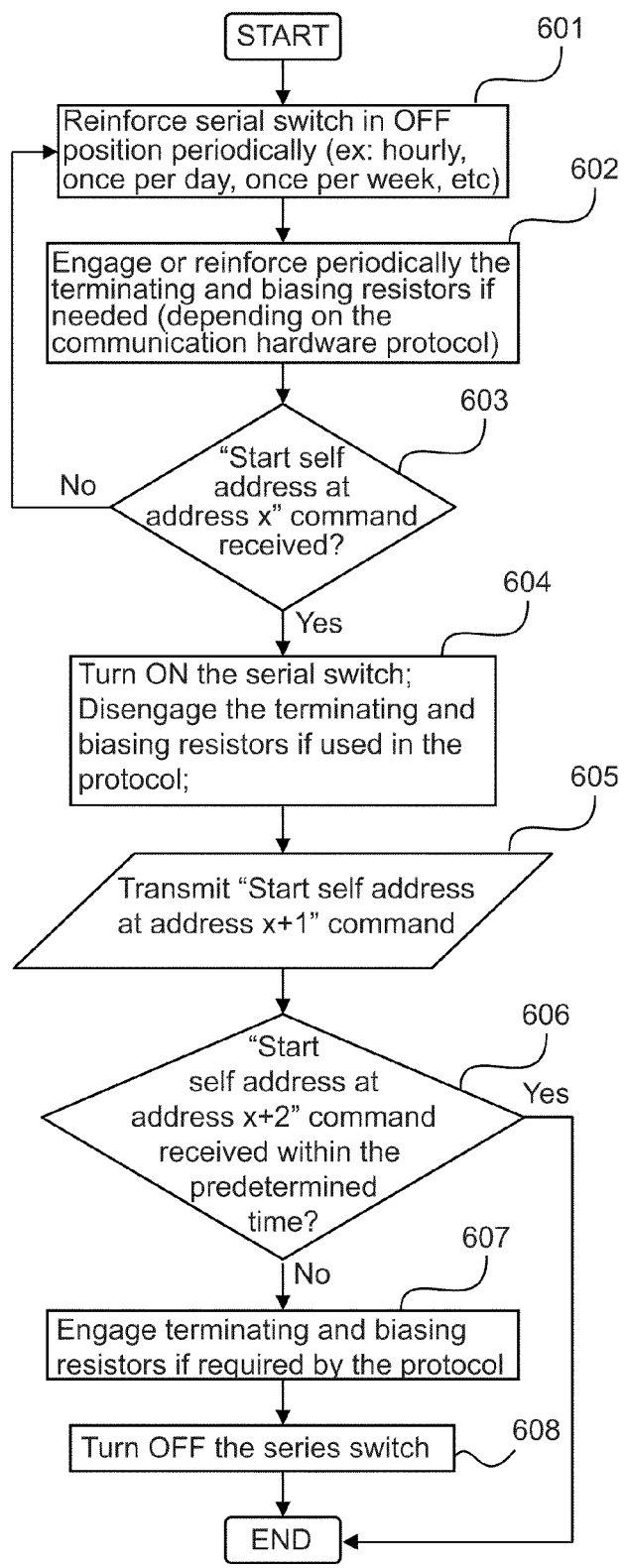
FIG. 6 illustrates a flowchart of an addressing method in an exemplary embodiment.

FIG. 6 illustrates a flowchart for an embodiment of an automatic addressing method 600 implemented at a network node. At block 601, the method begins by setting the switch to the off position periodically. Similarly, at block 603 the method periodically engages the terminating and biasing resistors, if used. At decision block 603 the node ascertains if it has received a start address at address "x" command. If not, the method returns to block 601. If it has received a start address command, then at block 604 the node sets its serial switch to the ON position and disengages any terminating and biasing resistors used. Then at block 604 the node transmits a start address at, for example address "x+1" command. At decision block 606 the node ascertains if a command to start address at, for example, "x+2," is sent by any of the other nodes within a predetermined period of time. If at decision block 606, the node ascertains that the command has been sent, the node keeps its series switch in the ON position and the method ends. If at decision block 606 the node does not ascertain that the command was sent within the predetermined time period, then at block 607 the node engages any terminating and biasing resistors and at block 608 it returns its series switch to the OFF position, in which case the node becomes the terminating node of the network and the method ends.

Figure 7A:
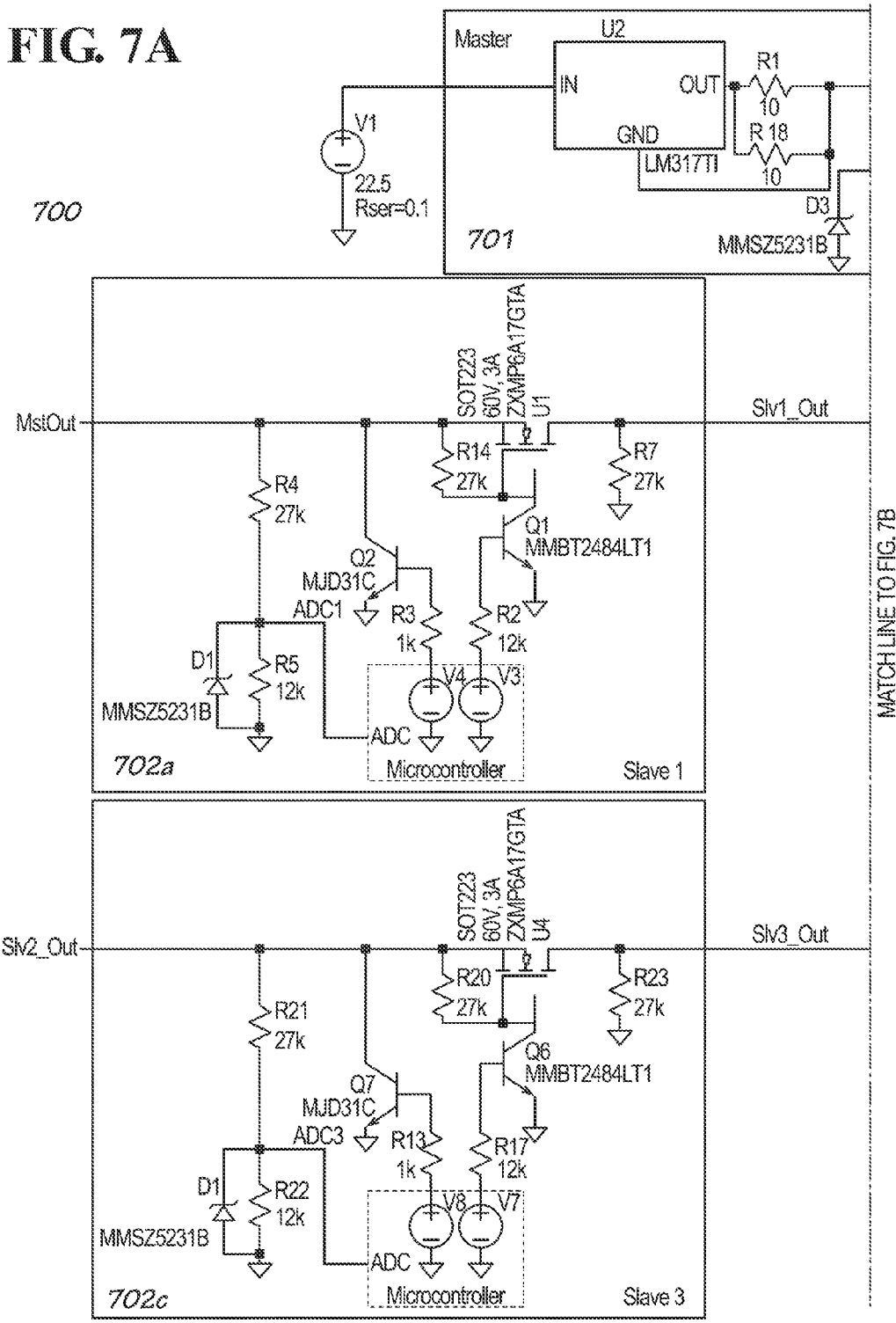
FIGS. 7A and 7B referred to collectively herein as FIG. 7 illustrate a DALI system in an exemplary embodiment.
Figure 7B:
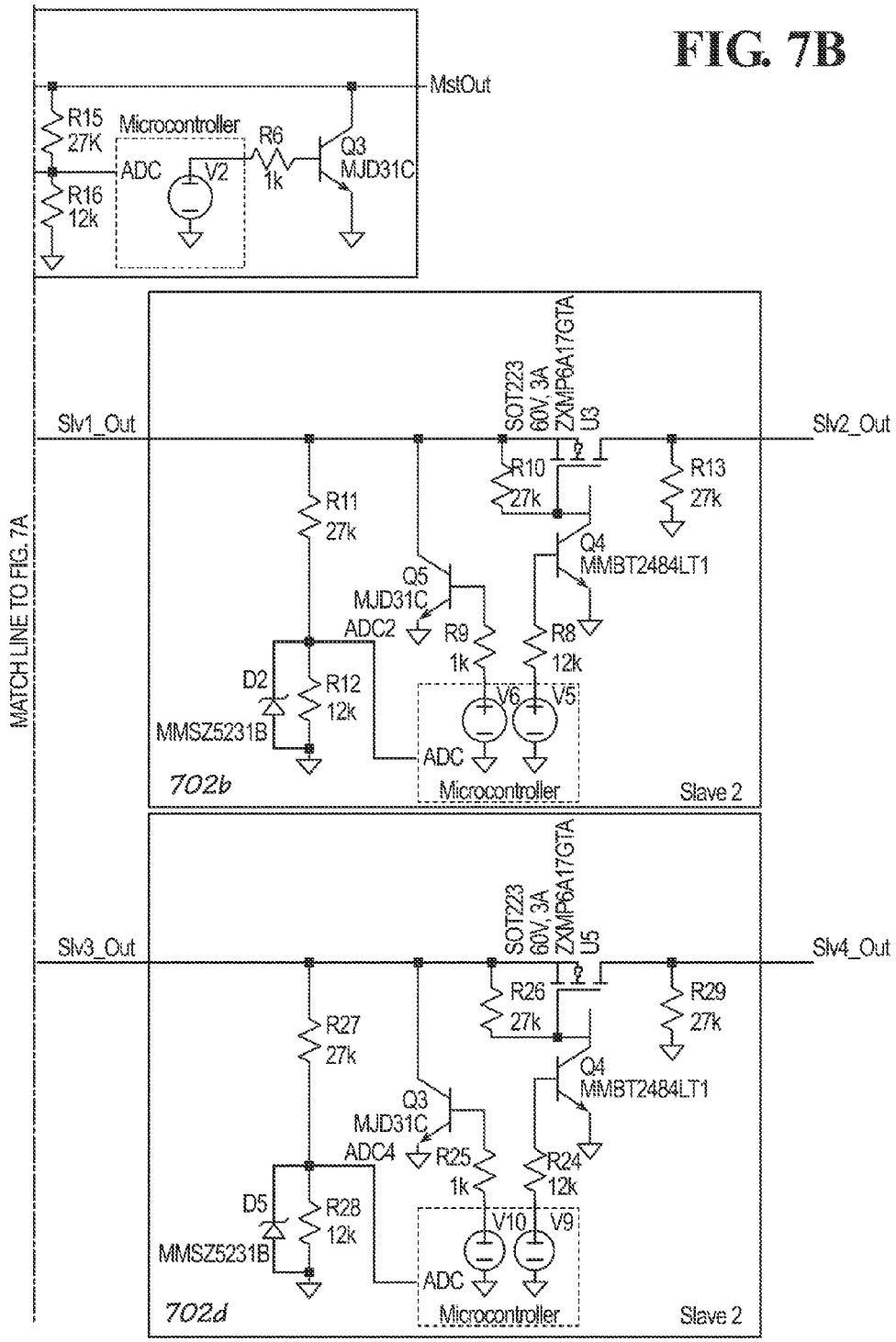
Figure 8:
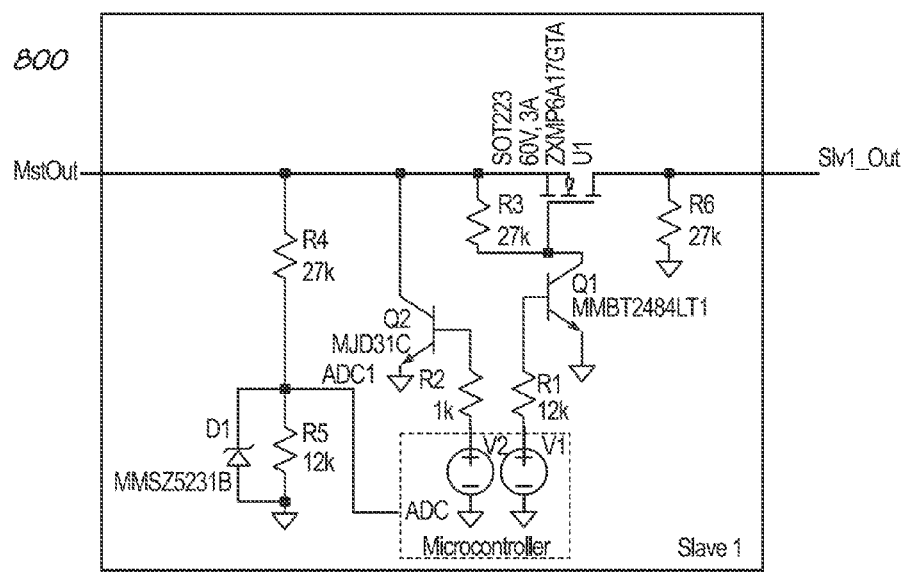
FIG. 8 illustrates a single slave DALI node in an exemplary embodiment.
Figure 9:
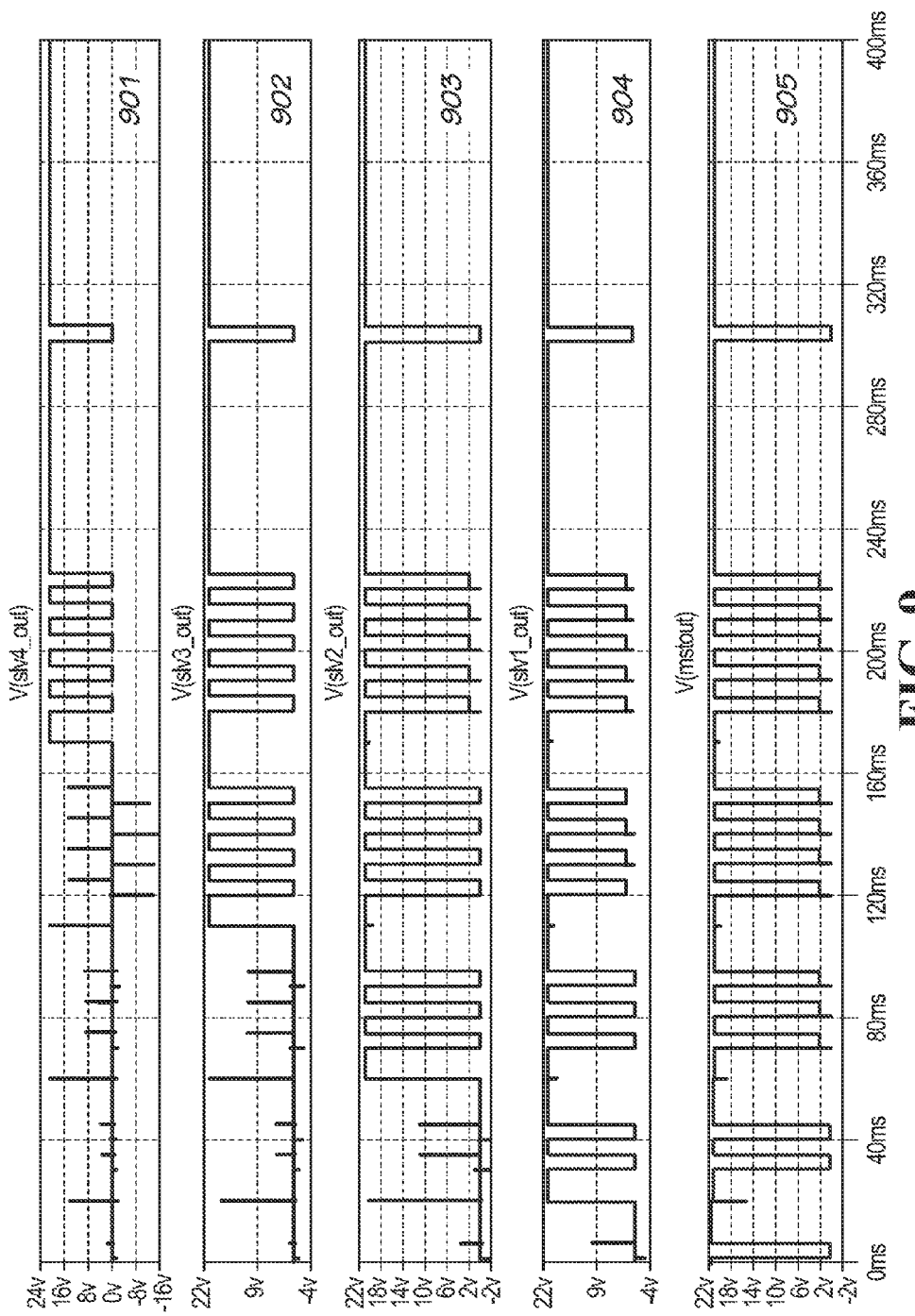
FIG. 9 illustrates waveforms in an exemplary embodiment.

FIG. 7 shows an exemplary embodiment of a DALI network implementation 700 comprising a master power supply and controller 701 and slave DALI nodes 702*a*, . . . , 702*d*. In this embodiment the series switch used is a P-channel MOSFET. The main physical characteristic of this component is low Rds_on which is necessary to keep the voltage drop across this device very minimal. Another way to completely eliminate this drop is to use an electromechanical relay. The main advantage of the use of a solid state switch over a relay is cost, but it does have the disadvantage of losing the polarity insensitive wiring feature of the slave DALI node. An electromechanical relay can be used as an alternative to preserve the DALI slave polarity insensitive wiring feature. FIG. 8 shows a close up schematic of a single DALI slave node 800. FIG. 9 presents waveforms 901-905 confirming the automated addressing scheme functionality.

Figure 10:
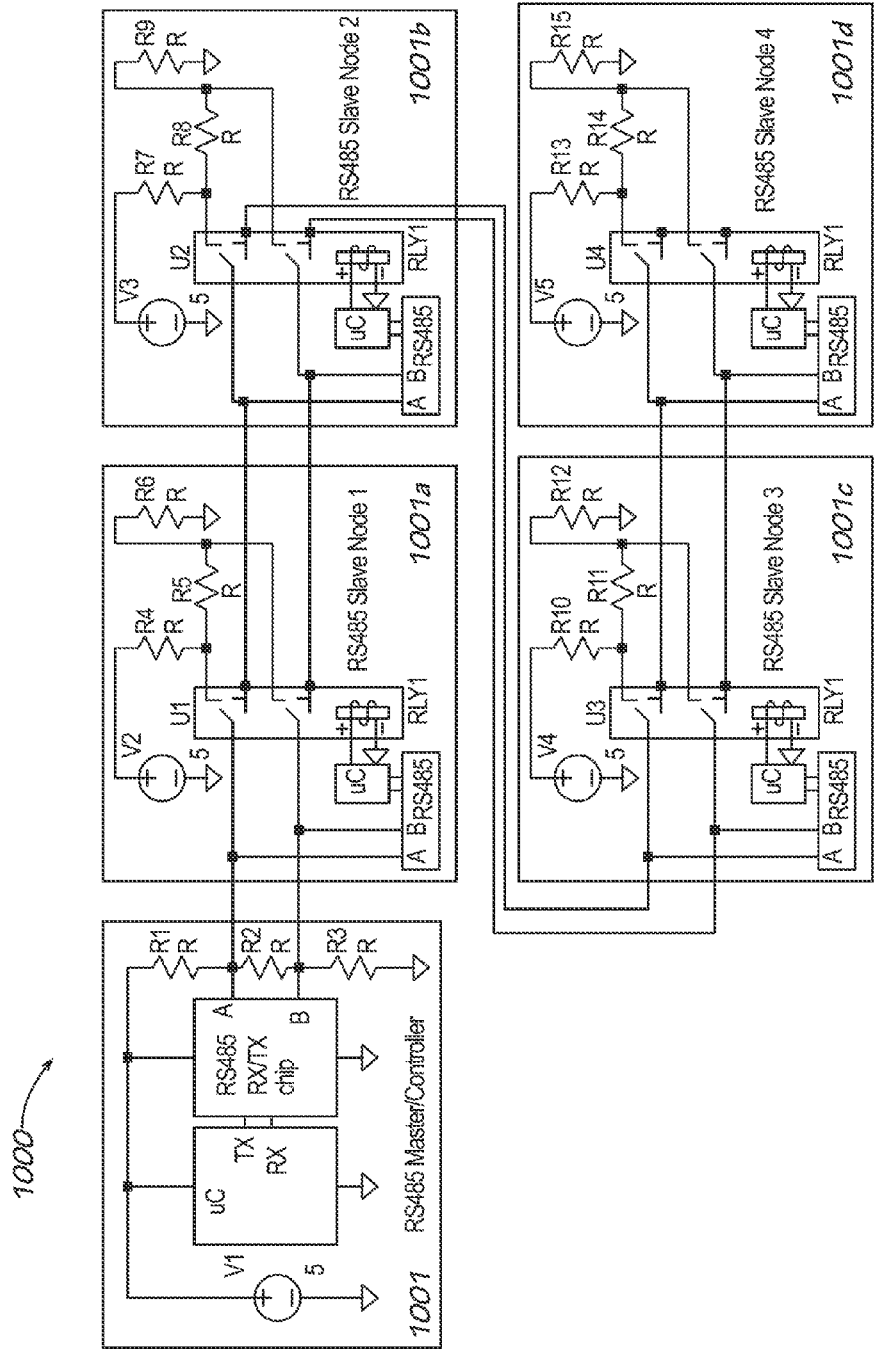
FIG. 10 illustrates an RS485 bus in an exemplary embodiment.

FIG. 10 shows an exemplary embodiment of an EIA-RS485 network implementation 1000 comprising a master/controller 1001 and four RS485 slave nodes 1002*a*, . . . , 1002*d*, where the slave nodes use DPDT relays.

Figure 11:
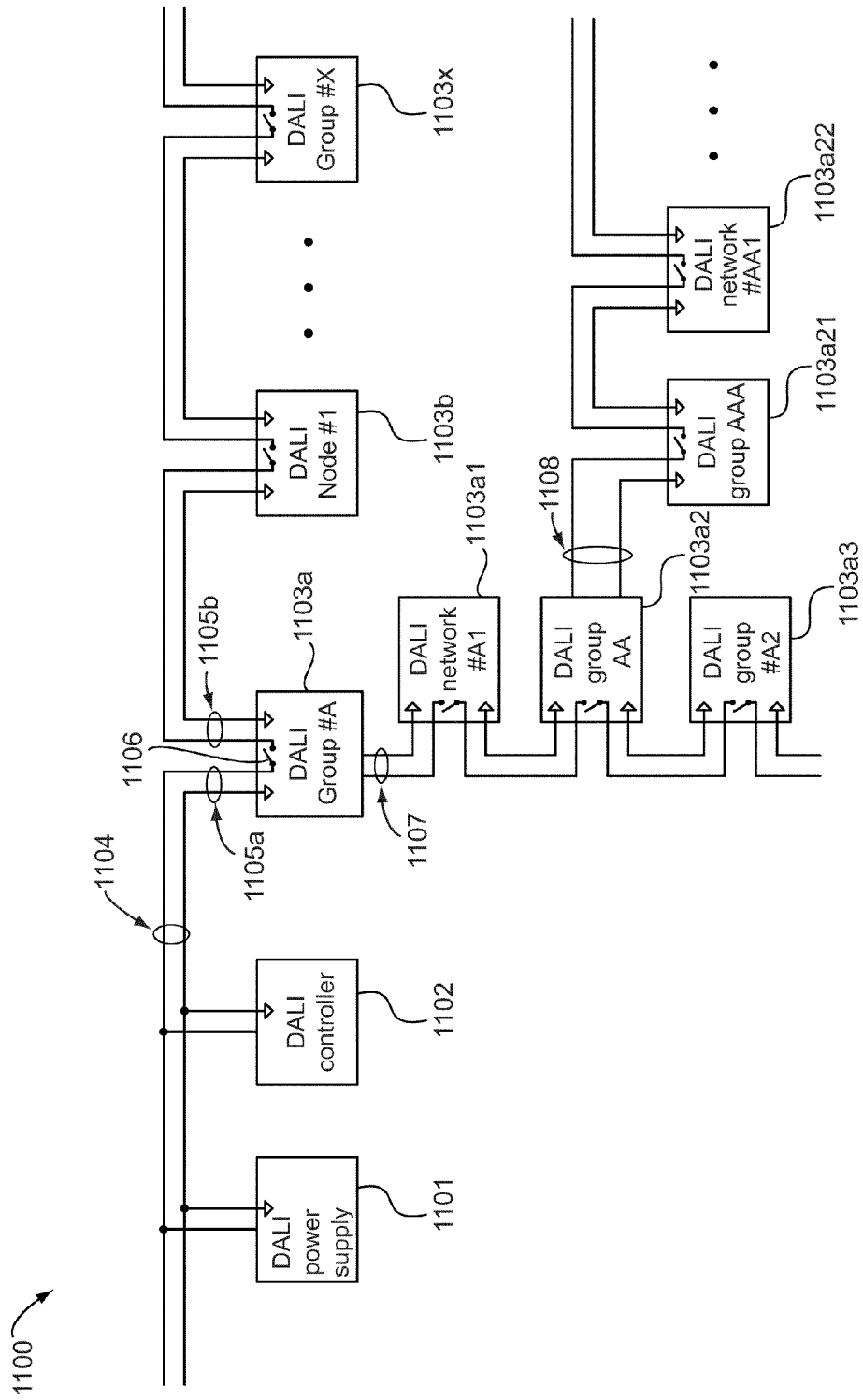
FIG. 11 illustrates a DALI network configuration in an exemplary embodiment.
Figure 12:
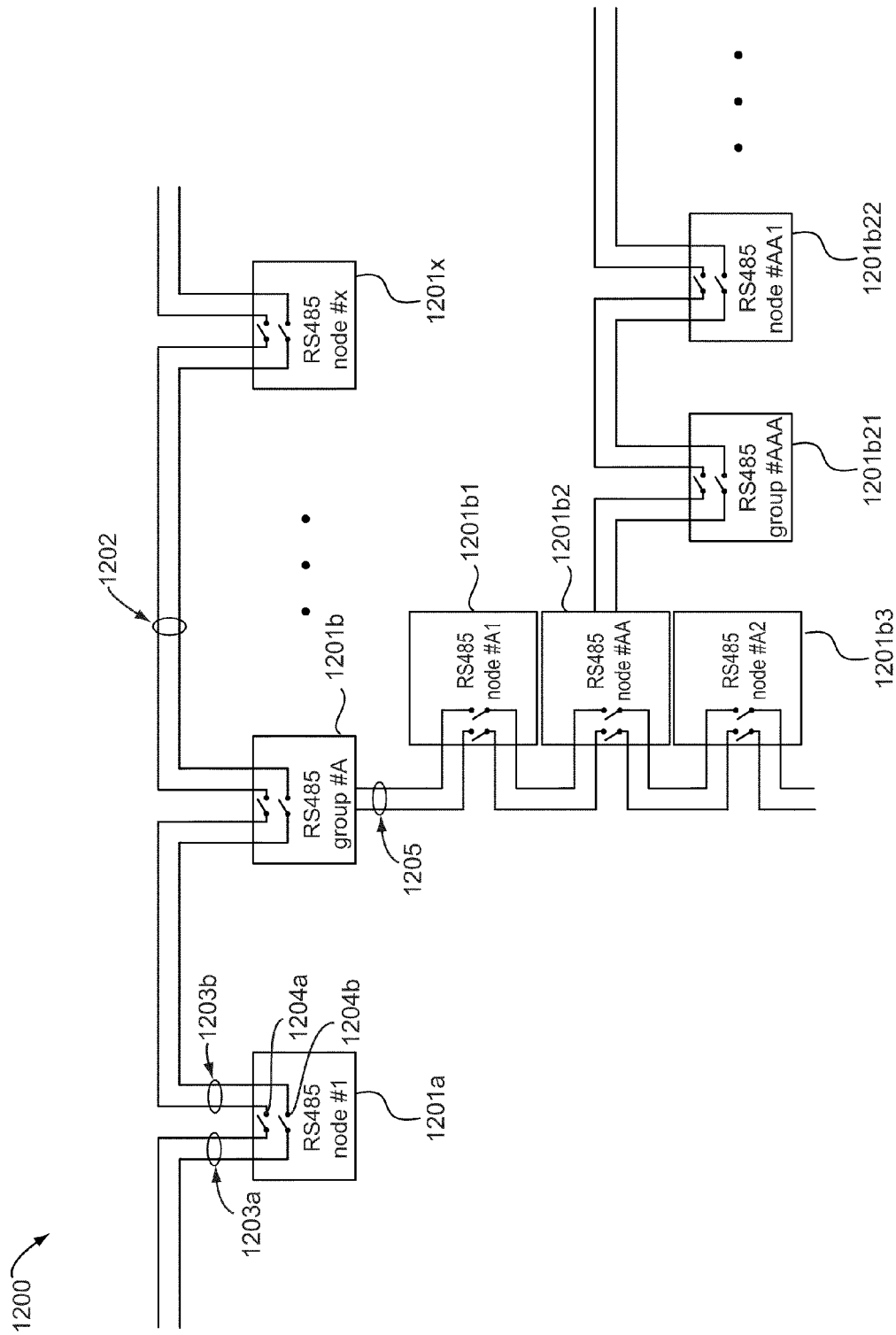
FIG. 12 illustrates an RS485 network configuration in an exemplary embodiment.

FIGS. 11 and 12 illustrate extensions of the network configurations of FIGS. 3 and 4 respectively to self-explanatory hybrid topologies. In these figures a "group" refers to a sub-network comprising one or more nodes, so that use of a group node, such as group #A node 1103*a*, results in both a main network in which node 1103*a* is a slave node and a subnetwork, which in this embodiment comprises nodes 1103*a*, 1103*a*1, 1103*a*2, 1103*a*3, and so on, in which node 1103*a* is a master node or a controller. As hybrid topologies are well known, one of ordinary skill in the art will understand how to extend embodiments of the invention to operate with such topologies through use of an appropriate addressing protocol in which node 1103*a*, after self-addressing, closes the appropriate switches and communicates a next address onto communication bus 1104 and also communicates an appropriate next subaddress onto communication bus 1107. For example, the group node could send a command to "start self address and start with Ax" onto communication bus 1107. One of ordinary skill in the art will recognize that subaddressing can be accomplished in a variety of ways. The hybrid topology embodiment illustrated in FIG. 12 operates similarly.

In these illustrative embodiments, the master or controller knows or learns the existence of each slave node and the address of that node. Each node can be programmed to respond to certain commands to identify itself in addition to provide its own address. For example, the node response converted from digital to plain English language could be "I'm up and running, my address is xxxxxxx, I'm occupancy sensor, and I'm the last node on the network so the EIA-RS485 bus is terminated here".

GENERAL

Embodiments of the present disclosure may comprise systems having different architectures and methods having different information flows than those shown in the Figures. The systems shown are merely illustrative and are not intended to indicate that any system component, feature, or information flow is essential or necessary to any embodiment or limiting the scope of the present disclosure. The foregoing description of the embodiments has been presented only for the purpose of illustration and description and is not intended to be exhaustive or to limit the disclosure to the precise forms disclosed. Numerous modifications and adaptations are apparent to those skilled in the art without departing from the spirit and scope of the disclosure.

We claim:

1. A method of assigning an address to a node of a multi-drop wired network, wherein each node of the multi-drop wired network can connect to a two-way communication bus via an input port and an output port, the method comprising:
   receiving at an input port of a first node a first address, where the input port of the first node is connected to the communication bus;
   assigning the first address to the first node;
   activating an output port of the first node to enable a second node to receive communications from the first node via the communication bus;
   determining a second address based on the first address; and
   sending the second address onto the communication bus via both the input port of the first node and the output port of the first node.

2. The method of claim 1 further comprising receiving an address subsequent to the second address at the first node via the communication bus.

3. The method of claim 1 further comprising receiving the second address at a controller.

4. The method of claim 1 wherein activating an output port of the first node to enable a second node to receive communications from the first node via the communication bus comprises closing one or more switches.

5. The method of claim 4 wherein the one or more switches are selected from a group comprising a solid state switch and an electromechanical relay.

6. The method of claim 1 wherein the first node is selected from a group comprising a DALI node, an EIA-RS485 node, and EIA-RS232 node, an EIA-RS422 node, an EIA-RS423 node, an inter-integrated circuit node, and a controller-area network node.

7. The method of claim 1 further comprising deactivating the output port of the first node and terminating the multi-drop wired network at the first node.

8. The method of claim 1 further comprising deactivating the output port of the first node in response to a message received from a controller via the communication bus.

9. The method of claim 8 wherein a message received from a controller via the communication bus is received periodically.

10. The method of claim 1 further comprising deactivating the output port of the first node and biasing the multi-drop wired network at the first node.

11. The method of claim 1 wherein the first address is sent onto the communication bus by a controller.

12. The method of claim 1 further comprising
receiving at an input port of the second node the second address, where the input port of the second node is connected to the communication bus;
assigning the second address to the second node;
sending a response message via the communication bus from the second node to the first node.

13. The method of claim 1 further comprising sending a message via the communication bus from the first node to a controller.

14. The method of claim 1 wherein the first node is a group node, the method further comprising:
activating a second output port of the first node to enable a third node to receive communications from the first node via a second two-way communication bus;
determining a third address; and
sending the third address onto the second communication bus via the second output port of the first node.

15. A system for addressing one or more nodes of a multi-drop wired network comprising:
a controller connected to a two-way communication bus;
a plurality of nodes, each having an input port and an output port for connecting to the communication bus;
at each node, one or more switches connecting the input port of the node to the output port of the node;
wherein
the controller communicates a first address via the communication bus to a first node, which connects to the communication bus through an input port of the first node;
the first node activates the output port of the first node by setting one or more switches between the input port of the first node and the output port of the first node to the ON position; and
the first node communicates a second address onto the communication bus through both the input port of the first node and the output port of the first node.

16. The system of claim 15 wherein the plurality of nodes is selected from a group comprising DALI nodes, EIA-RS485 nodes, EIA-RS232 nodes, EIA-RS422 nodes, EIA-RS423 nodes, inter-integrated circuit nodes, and controller-area network nodes.

17. The system of claim 15 further comprising
a group node having an input port connected to the communication bus, a first output port for connecting to the communication bus, and a second output port connected to a second two-way communication bus;
at the group node, one or more switches connecting the input port of the group node to the first output port of the group node;
wherein
the group node receives through the input port of the group node connected to the communication bus a third address;
the group node activates the first output port of the group node by setting one or more switches between the input port of the group node and the first output port of the group node to the ON position;
the group node communicates a fourth address onto the communication bus through both the input port of the group node and the first output port of the group node; and
the group node communicates a fifth address onto the second communication bus through the second output port of the group node.

18. The system of claim 15 wherein the first node receives an address subsequent to the second address via the communication bus.

* * * * *